United States Patent
Bell

(10) Patent No.: US 11,047,489 B2
(45) Date of Patent: *Jun. 29, 2021

(54) SERVICEABLE AND ADJUSTABLE FULL BORE BALL VALVE TRIM ARRANGEMENT

(71) Applicant: FISHER CONTROLS INTERNATIONAL LLC, Marshalltown, IA (US)

(72) Inventor: Brandon Wayne Bell, Marshalltown, IA (US)

(73) Assignee: Fisher Controls International LLC, Marshalltown (ID)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,653

(22) Filed: Dec. 12, 2019

(65) Prior Publication Data

US 2020/0116264 A1    Apr. 16, 2020

Related U.S. Application Data

(63) Continuation of application No. 15/896,979, filed on Feb. 14, 2018, now Pat. No. 10,544,868.

(51) Int. Cl.
*F16K 5/20* (2006.01)
*F16K 5/06* (2006.01)
*F16K 27/06* (2006.01)

(52) U.S. Cl.
CPC ............ *F16K 5/201* (2013.01); *F16K 5/0626* (2013.01); *F16K 5/0636* (2013.01); *F16K 27/067* (2013.01); *F16K 5/205* (2013.01)

(58) Field of Classification Search
CPC ........ F16K 5/06; F16K 5/0605; F16K 5/0626; F16K 5/0636; F16K 5/20; F16K 5/201; F16K 5/205; F16K 27/067
See application file for complete search history.

(56) References Cited

U.S. PATENT DOCUMENTS 2,480,529 A    8/1949  Waag
2,819,868 A  ‡  1/1958  Cauffman ............... F16K 5/201
                                                    251/315.08

(Continued)

FOREIGN PATENT DOCUMENTS

CN    103629387 A  ‡  3/2014
CN    103629387 A      3/2014

(Continued)

*Primary Examiner* — David Colon-Morales
(74) *Attorney, Agent, or Firm* — Quarles & Brady LLP

(57) ABSTRACT

Embodiments of the invention provide a trim arrangement for a ball valve. The trim arrangement can include a first seat assembly having a first seat, a threaded collar, and a biasing element. The first seat can be in contact with a first side of a ball element, and the threaded collar can be threadably coupled to the first seat and can be in engagement with the biasing element. The trim arrangement further includes a second seat assembly having a second seat in contact with a second side of the ball element. The threaded collar can have a profile that is configured to non-rotatably and slidably engage a corresponding profile of a collar bore of the valve body to prevent rotation of the threaded collar relative to the valve body.

20 Claims, 8 Drawing Sheets

(56) References Cited

U.S. PATENT DOCUMENTS

| | | | | |
|---|---|---|---|---|
| 3,134,396 A ‡ | 5/1964 | Bredtschneider | ....... | F16K 5/201 |
| | | | | 137/315.19 |
| 3,653,631 A ‡ | 4/1972 | Hurst | ...................... | F16K 5/201 |
| | | | | 251/159 |
| 3,717,323 A ‡ | 2/1973 | Geipel | .................. | F16K 5/0626 |
| | | | | 251/315.13 |
| 4,266,566 A | 5/1981 | Kacal et al. | | |
| 4,366,946 A ‡ | 1/1983 | Roark | ..................... | F16K 5/201 |
| | | | | 251/159 |
| 4,506,864 A ‡ | 3/1985 | Hartmann | ............... | F16K 5/201 |
| | | | | 251/174 |
| 4,676,480 A ‡ | 6/1987 | Garceau | ................. | F16K 5/201 |
| | | | | 251/159 |
| 4,815,701 A ‡ | 3/1989 | Stone | .................... | F16K 5/0673 |
| | | | | 251/174 |
| 4,844,410 A ‡ | 7/1989 | Eminger | ............... | F16K 5/0673 |
| | | | | 251/159 |
| 4,867,414 A | 9/1989 | Hubacek | | |
| 5,313,976 A ‡ | 5/1994 | Beasley | ................ | F16K 5/0636 |
| | | | | 137/15.22 |
| 5,549,275 A ‡ | 8/1996 | Knox | ...................... | F16K 5/201 |
| | | | | 137/241 |
| 5,676,347 A ‡ | 10/1997 | Knox | ...................... | F16K 5/201 |
| | | | | 251/170 |
| 7,690,626 B2 ‡ | 4/2010 | Stunkard | ............... | F16K 5/0642 |
| | | | | 251/174 |
| 8,733,733 B2 ‡ | 5/2014 | Collison | ............... | F16K 5/0636 |
| | | | | 251/174 |
| 9,835,259 B2 ‡ | 12/2017 | Shah | ..................... | F16K 5/0636 |
| 10,544,868 B2 * | 1/2020 | Bell | ....................... | F16K 27/067 |
| 2010/0230624 A1 ‡ | 9/2010 | Tejamo | .................. | F16K 5/201 |
| | | | | 251/315.16 |
| 2016/0186870 A1 | 6/2016 | Ricard et al. | | |
| 2017/0299072 A1 ‡ | 10/2017 | Hawa | ..................... | F16K 5/0636 |

FOREIGN PATENT DOCUMENTS

| | | | | | | |
|---|---|---|---|---|---|---|
| CN | 104089044 A | ‡ | 10/2014 | ............. | F16K 27/08 |
| CN | 104089044 A | | 10/2014 | | |
| FR | 1511626 A | ‡ | 2/1968 | ........... | F16K 5/0636 |
| GB | 950749 A | ‡ | 2/1964 | ............. | F16K 5/201 |
| GB | 950749 A | | 2/1964 | | |
| GB | 1198092 A | ‡ | 7/1970 | ........... | F16K 5/0636 |
| GB | 1198092 A | | 7/1970 | | |
| GB | 1198254 A | * | 7/1970 | ........... | F16K 5/0673 |
| GB | 1478808 A | ‡ | 7/1977 | ............. | F16K 5/201 |
| GB | 1478808 A | | 7/1977 | | |
| GB | 2262589 A | ‡ | 6/1993 | ............. | F16K 5/201 |
| GB | 2262589 A | | 6/1993 | | |

\* cited by examiner

‡ imported from a related application

SERVICEABLE AND ADJUSTABLE FULL BORE BALL VALVE TRIM ARRANGEMENT

CROSS-REFERENCE TO RELATED APPLICATIONS

This application is a continuation application of, and claims priority to, U.S. patent application Ser. No. 15/896,979, entitled "Ball Valve Having an Adjustable Trim Arrangement" and filed Feb. 14, 2018, the entire disclosure of which is incorporated herein in their entirety.

BACKGROUND

Fluid control valves (e.g., ball valves) are widely used in applications (e.g., oil and gas) where it is necessary to control or shut off a flow of a fluid in a passage. Typically, ball valves include a control element that is movable by an actuation mechanism between open and closed positions. For example, ball valves can be actuated using either a handle/lever fixed on top of a shaft or with an actuator fitted over the ball valve by a bracket/flange. In the closed position, the control element shuts off fluid flow and, in the open position, the control element provides fluid flow through the valve.

SUMMARY

Embodiments of the invention relate generally to valves and, more specifically, to a ball valve having a serviceable and adjustable trim arrangement.

Some embodiments of the invention provide a trim arrangement for a ball valve. The ball valve includes a one-piece valve body and a ball element in an interior cavity of the one-piece valve body. The trim arrangement includes a first seat assembly having a first seat, a threaded collar, and a biasing element. The first seat is in contact with a first side of the ball element. The threaded collar is threadably coupled to the first seat and in engagement with the biasing element. The trim arrangement further includes a second seat assembly having a second seat that is in contact with a second side of the ball element. The biasing element biases the first seat toward the first side of the ball element to provide a contact stress between the first seat and the first side of the ball element and the second seat and the second side of the ball element. The contact stress provided by the biasing element is adjustable by rotating the first seat.

Other embodiments of the invention provide a ball valve that includes a one-piece valve body having an interior cavity with a collar bore, a ball element positioned in the interior cavity, and a trim arrangement in the interior cavity. The trim arrangement includes a first seat in contact with a first side of the ball element, a second seat in contact with a second side of the ball element, and a threaded collar received in the collar bore and threadably coupled to the first seat. The threaded collar is inhibited from rotating in the collar bore and is allowed to translate along the collar bore. The trim arrangement further includes a biasing element engaged between a biasing surface of the collar bore and the threaded collar to provide a contact stress between the first seat and the first side of the ball element and the second seat and the second side of the ball element. The contact stress provided by the biasing element is adjustable by translating the threaded collar along the collar bore via rotating the first seat.

Still other embodiments of the invention provide a ball valve that includes a one-piece valve body having a bonnet aperture and an interior cavity with a collar bore, and a bonnet at least partially received in the bonnet aperture and including a bottom surface in the interior cavity. The ball valve further includes a ball element in the interior cavity, and a trim arrangement in the interior cavity. The trim arrangement includes a first seat in contact with a first side of the ball element, a second seat in contact with a second side of the ball element, a threaded collar received in the collar bore and threadably coupled to the first seat, and a biasing element engaged between a biasing surface of the collar bore and the threaded collar. The first seat is inhibited from rotating by a first clearance between the first seat and the bottom surface of the bonnet. The second seat is inhibited from rotating by a second clearance between the second seat and the bottom surface of the bonnet. The threaded collar is inhibited from rotating in the collar bore, and when the bonnet is removed from the bonnet aperture, the threaded collar is allowed to translate along the collar bore during rotation of the first seat to adjust a biasing force provided by the biasing element on the first seat.

Still other embodiments of the invention provide a ball valve ball valve that includes a one-piece valve body having an interior cavity. The interior cavity includes a collar bore and a second collar bore arranged on opposing ends of the interior cavity. The ball valve further includes a ball element positioned in the interior cavity and having first and second flats, a ball passageway extending through the ball element, and a ball recess surrounding the ball passageway and extending axially into a first side of the ball element. The ball valve further includes a trim arrangement in the interior cavity. The trim arrangement includes a first seat in contact with the first side of the ball element, a second seat in contact with a second side of the ball element, a biasing element engaged between a biasing surface of the collar bore and the first seat to provide a contact stress between the first seat and the first side of the ball element, and a second biasing element engaged between a second biasing surface of the second collar bore and the second seat to provide a contact stress between the second seat and the second side of the ball element.

Still other embodiments of the invention provide a ball valve that includes a one-piece valve body having an interior cavity. The interior cavity includes a collar bore and a second collar bore arranged on opposing ends of the interior cavity. The ball valve further includes a ball element positioned in the interior cavity and having first and second flats, a ball passageway extending through the ball element, the ball passageway defining a geometric profile that provides rotation control of the ball element. The ball valve further includes a trim arrangement in the interior cavity. The trim arrangement includes a first seat in contact with the first side of the ball element, a second seat in contact with a second side of the ball element, a biasing element engaged between a biasing surface of the collar bore and the first seat to provide a contact stress between the first seat and the first side of the ball element, and a second biasing element engaged between a second biasing surface of the second collar bore and the second seat to provide a contact stress between the second seat and the second side of the ball element.

Still other embodiments of the invention provide a method of manufacturing a ball valve. The ball valve includes a one-piece valve body having an interior cavity. The method includes inserting a biasing element into a first inner end of the interior cavity, installing a first seat into the first inner end of the interior cavity and engaged against the biasing element, inserting a second biasing element into a second inner end of the interior cavity, and installing a second seat into the second inner end of the interior cavity and engaged against the second biasing element. The method further includes arranging a ball element between the first seat and the second seat so that first and second flats of the ball element face the first and second seats, inserting a tool at least partially into the ball element, rotating the ball element, via rotation of the tool, so that spherical sides of the ball element engage the first and second seats, and rotating the ball element to align a ball passage along a flow axis defined by the ball valve. The method further includes coupling a shaft to the ball element and installing a bonnet onto the one-piece valve body.

Figure 1:
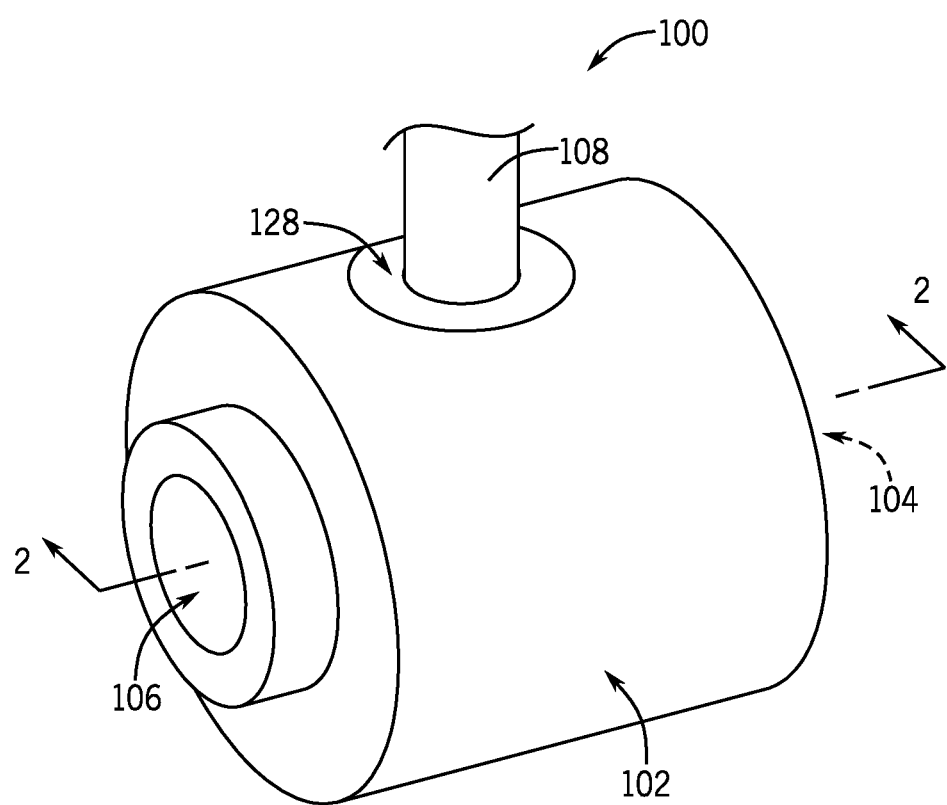
FIG. 1 is a top, back, left isometric view of a ball valve according to one embodiment of the invention.

Corresponding reference characters indicate corresponding parts throughout the several views. Although the drawings represent embodiments of the present invention, the drawings are not necessarily to scale and certain features may be exaggerated in order to better illustrate and explain the embodiments of the present disclosure.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
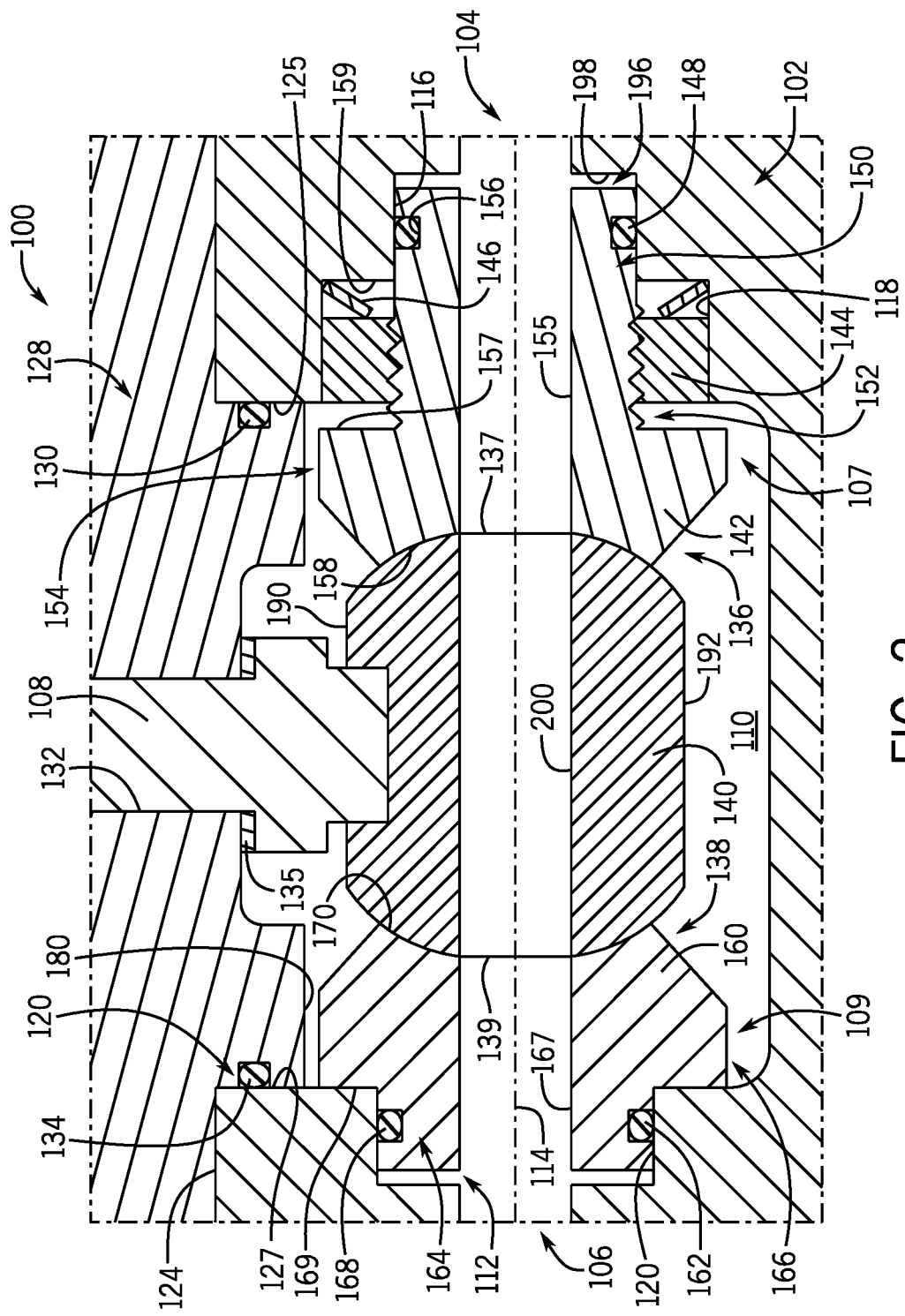
FIG. 2 is a partial cross-sectional view of the ball valve of FIG. 1 taken along line 2-2.

FIGS. 1 and 2 illustrate a ball valve 100 according to one embodiment of the invention. The ball valve 100 generally includes a valve body 102 having an inlet 104, an outlet 106, and a shaft 108 extending into the valve body 102. In some embodiments, the valve body 102 can be a one-piece valve body (i.e., fabricated from a single piece of material). In other embodiments, the valve body 102 can be a two-piece valve body that is formed by coupling two valve body halves. In the illustrated embodiment, the inlet 104 and the outlet 106 are formed at opposing ends of the valve body 102.

In some applications, the ball valve 100 can be integrated into a pipeline, or another fluid path, to selectively provide and shut off fluid flow. That is, the shaft 108 of the ball valve 100 can be selectively rotated, for example, via a lever or an actuator (not shown), to provide fluid flow between the inlet 104 and the outlet 106 and to inhibit fluid flow between the inlet 104 and the outlet 106.

As shown in FIG. 2, the valve body 102 defines an interior cavity 110 within which a trim arrangement 112 can be arranged. The use of the terms "trim arrangement," "valve trim," and "trim" are terms that generally relate to internal components of a valve. In some embodiments, for example, a trim arrangement can include removable and/or adjustable components arranged within a valve. In some embodiments, for example, a trim arrangement can include internal components of a valve arranged along a flow path defined within the valve.

The valve body 102 can define a flow axis 114 extending from the inlet 104 to the outlet 106 and through the interior cavity 110 along the trim arrangement 112. The use of the terms "axial," "radial," and "circumferential" are terms that refer to directions with respect to the flow axis 114. The interior cavity 110 can define axially separated and radially tiered bores at a first inner end 107 and a second inner end 109 of the interior cavity 110. In the illustrated embodiment, the first inner end 107 of the interior cavity 110 includes a first seat seal bore 116 arranged downstream of the inlet 104 and a collar bore 118 arranged downstream of the first seat seal bore 116. The second inner end 109 can include a second seat seal bore 120 arranged upstream of the outlet 106. Each of the first seat seal bore 116, the collar bore 118, and the second seat seal bore 120 defines a radial recess within the interior cavity 110 that extends in an axial direction along the flow axis 114. The use of the terms "downstream" and "upstream" are terms that indicate direction relative to the flow of a fluid. The term "downstream" corresponds to the direction of fluid flow, while the term "upstream" refers to the direction opposite or against the direction of fluid flow.

The valve body 102 can include a bonnet aperture 122 that extends through the valve body 102 and into the interior cavity 110. In the illustrated embodiment, the bonnet aperture 122 extends from a top surface 124 of the valve body 102, along a first top surface 125 of the first inner end 107 and a second top surface 127 of the second inner end 109, and into the interior cavity 110. When the ball valve 100 is assembled, a bonnet 128 can be received within the bonnet aperture 122. In some embodiments, at least a portion of the bonnet 128 may be clearance fit into the bonnet aperture 122 during assembly. The bonnet 128 can include a bonnet groove 130 that can receive a bonnet seal 134. In the illustrated embodiment, the bonnet seal 134 can be in the form of an o-ring. The bonnet seal 134 can provide a seal between the bonnet 128 and the bonnet aperture 122 on the valve body 102 to prevent atmospheric contaminants from entering the interior cavity 110.

The bonnet 128 can also include a shaft aperture 132 extending therethrough in a direction perpendicular to the flow axis 114. The shaft 108 can extend through the shaft aperture 132 and into the interior cavity 110. The shaft 108 can be rotatably received within the shaft aperture 132 so that the shaft 108 can be selectively rotated to transition the ball valve 100 between open and closed positions. In the illustrated embodiment, a thrust washer 135 can be arranged at an interface between the shaft 108 and the bonnet 128 within the interior cavity 110. The thrust washer 135 can absorb thrust originating from a pressure different between the internal cavity 110 and the exterior of the valve body 102 (i.e., ambient conditions). While the thrust washer 135 is shown as being positioned between surfaces of the shaft 108 and the bonnet 128 that are parallel to the flow axis 114, the thrust washer 135 can additionally or alternatively be positioned between surfaces of the shaft 108 and walls forming the shaft aperture 132 that are perpendicular to the flow axis 114.

Still referring to FIG. 2, the trim arrangement 112 can include a first seat assembly 136 and a second seat assembly 138. The first seat assembly 136 and the second seat assembly 138 provide seals on a first side 137 and a second side 139 of a ball element 140, respectively. The seals provided on the first and second sides 137 and 139 of the ball element 140 can allow the ball element 140 to rotate between the first seat assembly 136 and the second seat assembly 138, while preventing fluid from leaking past the seals. In other words, a contact stress provided on the first and second sides 137 and 139 of the ball element 140 by the first seat assembly 136 and the second seat assembly 138 can allow the ball element 140 to rotate and prevent fluid flow past the outlet 106 when the ball valve 100 is in the closed position.

The first seat assembly 136 can include a first seat 142, a threaded collar 144, a biasing element 146, and a first seat seal 148. The first seat 142 can include a first seal portion 150, a threaded portion 152, a first seat portion 154, and a first seat passage 155. The first seat passage 155 can extend axially through the first seat 142 to allow fluid to flow through the first seat 142. The first seat 142 can define a generally annular shape with the first seal portion 150 and the threaded portion 152 extending axially away from the first seat portion 154. In the illustrated embodiment, the threaded portion 152 is positioned between the first seat portion 154 and the first seal portion 150, and first seat 142 increases in diameter at a junction between the threaded portion 152 and the first seat portion 154. That is, a first stop surface 157 can extend radially outward from the outer diameter of the threaded portion 152 to the outer diameter of the first seat portion 154 at a junction between the threaded portion 152 and the first seat portion 154.

The first seal portion 150 can be dimensioned to be slidably received within the first seat seal bore 116 of the valve body 102. The first seal portion 150 can include a radially recessed notch 156 to receive the first seat seal 148. In the illustrated embodiment, the first seat seal 148 can be in the form of an o-ring. In some embodiments, the first seat seal 148 can be axially slidable (i.e., slidable in a direction along the flow axis 114) within the notch 156 along the first seat seal bore 116. In this way, axial movement of the first seat 142 does not affect the seal compression between the first seal portion 150 and the first seat seal bore 116 provided by the first seat seal 148.

When the ball valve 100 is assembled, the threaded collar 144 can be threaded onto the threaded portion 152 of the first seat 142 and received in the collar bore 118 of the valve body 102. The biasing element 146 can be arranged between a biasing surface 159 and the threaded collar 144. The biasing surface 159 extends radially outward between the first seat seal bore 116 and the collar bore 118 at a junction between the first seat seal bore 116 and the collar bore 118. The biasing element 146 provides a biasing force on the threaded collar 144 in an axial direction toward the ball element 140. As will be described below, the biasing force provided by the biasing element 146 can be adjusted by the threaded collar 144 being allowed to axially translate along the collar bore 118 in response to rotation of the first seat 142. In some embodiments, the biasing element 146 can be in the form of a spring. In other embodiments, the biasing element 146 can be in the form of a belleville washer, a coil spring, or any other suitable biasing element(s).

Since the threaded collar 144 is threadably coupled to the threaded portion 152 of the first seat 142, the biasing element 146 biases the first seat 142 into engagement with the ball element 140 and determines a contact stress applied to the first side 137 of the ball element 140. In particular, the first seat portion 154 of the first seat 142 includes a first seat surface 158 that defines a generally curved profile to conform to the first side 137 of the ball element 140. The contact stress between the first seat surface 158 of the first seat 142 and the first side 137 of the ball element 140 can ensure that a seal is formed between the first seat surface 158 and the first side 137 of the ball element 140 to prevent fluid from leaking past the outlet 106 when the ball valve 100 is in the closed position. In addition, the contact stress can still allow the ball element 140 to rotate while engaging the first seat 142.

The second seat assembly 138 can include a second seat 160 and a second seat seal 162. The second seat 160 can include a second seal portion 164, a second seat portion 166, and a second seat passage 167. The second seat passage 167 can extend axially through the second seat 160 to allow fluid to flow through the second seat 160. The second seat 160 can define a generally annular shape with the second seal portion 164 extending axially away from the second seat portion 166. In the illustrated embodiment, the second seat 160 increases in diameter at a junction between the second seal portion 164 and the second seat portion 166. That is, a second stop surface 169 can extend radially outward from the outer diameter of the second seal portion 164 to the outer diameter of the second seat portion 166 at a junction between the second seal portion 164 and the second seat portion 166.

The second seal portion 164 can be dimensioned to be slidably received within the second seat seal bore 120 of the valve body 102. The second seal portion 164 can include a second radially recessed notch 168 to receive the second seat seal 162. In the illustrated embodiment, the second seat seal 162 can be in the form of an o-ring. In some embodiments, the second seat seal 162 can be axially slidable (i.e., slidable in a direction along the flow axis 114) within the notch 168 along the second seat seal bore 120. In this way, axial movement of the second seat 160 does not affect the seal compression between the second seal portion 164 and the second seat seal bore 120 provided by the second seat seal 162.

The second seat portion 166 of the second seat 160 includes a second seat surface 170 that defines a generally curved profile to conform to the second side 139 of the ball element 140. The contact stress between the second seat surface 170 of the second seat 160 and the second side 139 of the ball element 140 (e.g., determined by the biasing element 146) can provide a seal between the second seat surface 170 and the second side 139 of the ball element 140 to prevent fluid flow past the outlet 106 when the ball valve 100 is in the closed position. In addition, a magnitude of the contact stress can allow the ball element 140 to rotate while engaging the second seat 160.

In some embodiments, the design of the threaded collar 144 and the collar bore 118 can prevent rotation of the threaded collar 144 when the ball valve 100 is assembled. That is, once the threaded collar 144 is inserted into the collar bore 118, the threaded collar 144 can be prevented from rotating relative to the valve body 102, but still be allowed to axially translate along the collar bore 118. This axial movement of the threaded collar 144 can determine a contact stress provided on the ball element 140 by the first and second seats 142 and 160 by the biasing element 146.

Figure 3:
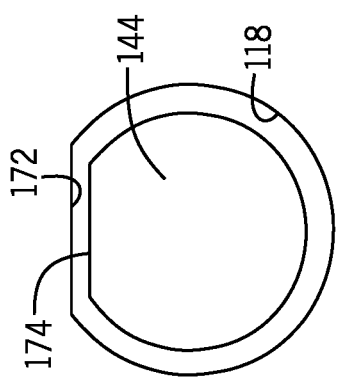
FIG. 3 is a schematic illustration of a threaded collar and a collar bore of the ball valve of FIG. 1, with an outer diameter of the threaded collar and the collar bore each including a flat surface according to one embodiment of the invention.

In some embodiments, as illustrated in FIG. 3, the collar bore 118 can include a bore surface 172 that interacts with a collar surface 174 on the threaded collar 144 to prevent rotation of the threaded collar 144 in the collar bore 118. The collar surface 174 can define a generally flat surface that interrupts a circumferential profile of the outer diameter of the threaded collar 144. The bore surface 172 can define a generally flat surface that corresponds with the shape of the collar surface 174 and interrupts a circumferential profile of the collar bore 118. In these embodiments, a clearance between the collar surface 174 and the bore surface 172 can ensure that the collar surface 174 contacts the bore surface 172 to prevent rotation of the threaded collar 144.

Figure 4:
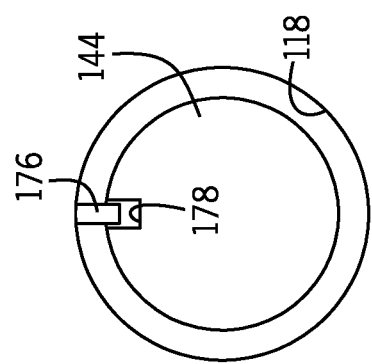
FIG. 4 is a schematic illustration of a threaded collar and a collar bore of the ball valve of FIG. 1, with the threaded collar including a recess and the collar bore including a protrusion according to another embodiment of the invention.

In other embodiments, as illustrated in FIG. 4, a protrusion 176 can extend radially inward from a wall forming the collar bore 118 and extend into a radially recessed slot 178 in the threaded collar 144. In this way, when the threaded collar 144 is at least partially inserted into the collar bore 118, the threaded collar 144 can be keyed to the wall forming the collar bore 118 to prevent rotation of the threaded collar 144 relative to the collar bore 118. In some embodiments, the protrusion 176 can extend radially outward from the outer diameter of the threaded collar 144, and the collar bore 118 can include the radially recessed slot 178.

Figure 5:
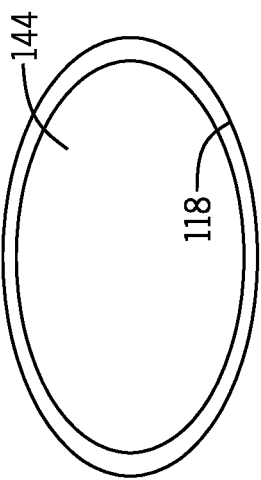
FIG. 5 is a schematic illustration of a threaded collar and a collar bore of the ball valve of FIG. 1, with an outer diameter of the threaded collar and the collar bore defining an oval shape according to another embodiment of the invention.
Figure 7:
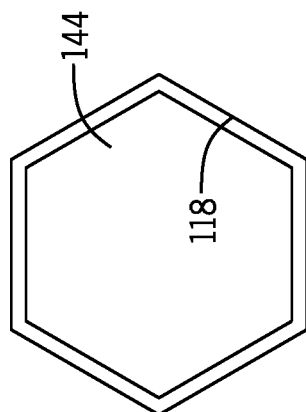
FIG. 7 is a schematic illustration of a threaded collar and a collar bore of the ball valve of FIG. 1, with an outer diameter of the threaded collar and the collar bore defining a hexagonal shape according to another embodiment of the invention.
Figure 6:
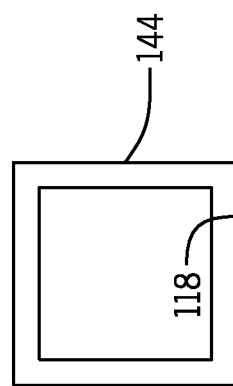
FIG. 6 is a schematic illustration of a threaded collar and a collar bore of the ball valve of FIG. 1, with an outer diameter of the threaded collar and the collar bore defining a rectangular shape according to another embodiment of the invention.

In still other embodiments, a geometric profile defined by the collar bore 118 and a complementary geometric profile defined by an outer diameter of the threaded collar 144 can prevent rotation of the threaded collar 144 in the collar bore 118. For example, as illustrated in FIGS. 5-7, the collar bore 118 and the outer diameter of the threaded collar 144 can define an oval shape (FIG. 5), a rectangular shape (FIG. 6), or a polygonal (e.g., hexagonal) shape (FIG. 7). These geometric shapes defined by the collar bore 118 and the outer diameter of the threaded collar 144 illustrated in FIGS. 5-7 can prevent rotation of the threaded collar 144 in the collar bore 118. That is, the geometric shapes can ensure that at least a portion of the outer diameter of the threaded collar 144 contacts the walls forming the collar bore 118, upon attempted rotation of the threaded collar 144, to prevent rotation of the threaded collar 144 in the collar bore 118.

Figure 8:
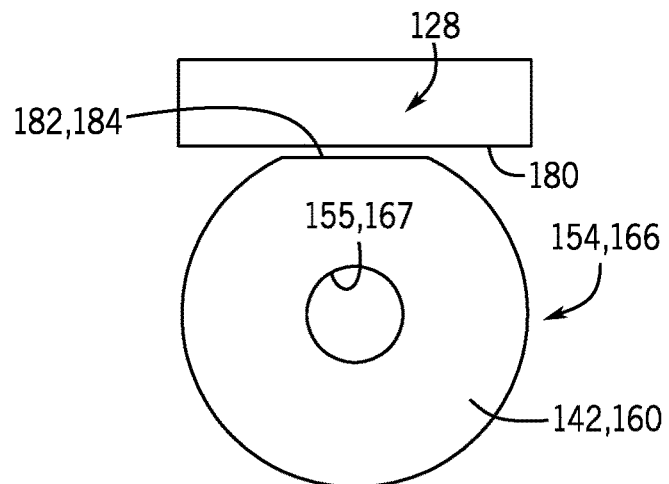
FIG. 8 is a schematic illustration of a seat and a bonnet of the ball valve of FIG. 1, with an outer diameter of the seat including a flat surface according to one embodiment of the invention.

In some embodiments, as shown in FIG. 2, the first seat 142 can be prevented from rotating when the ball valve 100 is assembled. That is, a geometry defined by an outer diameter of the first seat portion 154 can interact with a bottom surface 180 of the bonnet 128 to prevent the first seat 142 from rotating when the bonnet 128 is installed onto the valve body 102. In some embodiments, as illustrated in FIG. 8, the outer diameter of the first seat portion 154 can include a first outer seat surface 182 that is generally flat and interrupts the circumferential profile of the outer diameter of the first seat portion 154. In these embodiments, a first clearance between the first outer seat surface 182 of the first seat portion 154 and the bottom surface 180 of the bonnet 128 can inhibit the first seat 142 from rotating after the ball valve 100 is assembled. That is, the first clearance between the first outer seat surface 182 and the bottom surface 180 can be sufficiently small to ensure that the first outer seat surface 182 contacts the bottom surface 180, upon attempted rotation of the first seat 142, to prevent rotation of the first seat 142.

Similar to the first seat 142, the second seat 160 can be prevented from rotating when the ball valve 100 is assembled. That is, a geometry defined by an outer diameter of the second seat portion 166 can interact with the bottom surface 180 of the bonnet 128 to prevent the second seat 160 from rotating, when the bonnet 128 is installed onto the valve body 102. In some embodiments, the outer diameter of the second seat portion 166 can include a second outer seat surface 184, and a second clearance between the second outer seat surface 184 and the bottom surface 180 of the bonnet 128 can prevent the second seat 160 from rotating after the ball valve 100 is assembled. That is, the second clearance between the second outer seat surface 184 and the bottom surface 180 can be sufficiently small to ensure that the second outer seat surface 184 contacts the bottom surface 180, upon attempted rotation of the second seat 160, to prevent rotation of the second seat 160.

Figure 9:
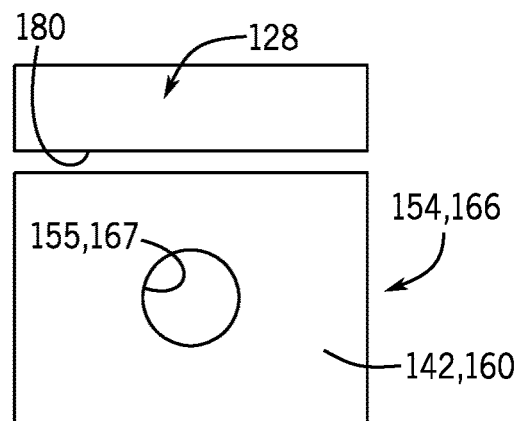
FIG. 9 is a schematic illustration of a seat and a bonnet of the ball valve of FIG. 1, with an outer diameter of the seat defining a rectangular shape according to another embodiment of the invention.
Figure 10:
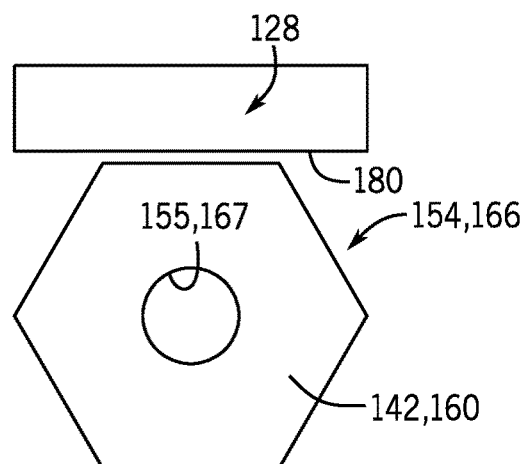
FIG. 10 is a schematic illustration of a seat and a bonnet of the ball valve of FIG. 1, with an outer diameter of the seat defining a hexagonal shape according to another embodiment of the invention.

In other embodiments, the outer diameter of the first seat portion 154 and/or the second seat portion 166 can define a geometric shape that includes one or more flat surfaces that can interact with the bottom surface 180 of the bonnet 128 to prevent rotation of the first seat portion 154 and/or the second seat portion 166. For example, as illustrated in FIGS. 9 and 10, the outer diameter of the first seat portion 154 and/or the second seat portion 166 can define a rectangular shape (FIG. 9) or a hexagonal shape (FIG. 10). In still other embodiments, the outer diameter of the first seat portion 154 and/or the second seat portion 166 can define a geometric shape with more or less than six sides to provide more granular adjustment of the contact stress adjusted via rotation the first seat 142.

Assembly and operation of the ball valve 100 will be described with reference to FIGS. 1 and 2. The following description of the order in which the components of the ball valve 100 are assembled is not meant to be limiting in any way, and alternative sequences are included in the scope of the invention. To install the trim arrangement 112 into the valve body 102, initially, the second seat assembly 138 may be inserted through the bonnet aperture 122 of the valve body 102 and the second seal portion 164 can be axially inserted into the second seat seal bore 120. As the second seal portion 164 is inserted into the second seat seal bore 120, the second seat seal 162 can engage and slide axially along the second seat seal bore 120. In some embodiments, the second seal portion 164 can be axially inserted into the second seat seal bore 120 until the second stop surface 169 engages the second top surface 127 of the second inner end 109. With the second seat assembly 138 installed within the interior cavity 110 of the valve body 102, the engagement between the second seat seal 162 and the second seat seal bore 120 can provide a seal to prevent fluid from leaking past the outlet 106 when the ball valve 100 is in the closed position.

Next, the first seat assembly 136 can be installed into the interior cavity 110 of the valve body 102. Initially, the biasing element 146 can be installed into the collar bore 118 to engage the biasing surface 159. With the threaded collar 144 threaded onto the threaded portion 152 of the first seat 142, the first seat 142 can be inserted through the bonnet aperture 122 of the valve body 102 and the first seal portion 150 can be axially inserted into the first seat seal bore 116. As the first seal portion 150 is inserted axially into the first seat seal bore 116, the first seat seal 148 can engage and slide axially along the first seat seal bore 116 and the threaded collar 144 can engage the biasing element 146. Once the threaded collar 144 is at least partially arranged within the collar bore 118, the threaded collar 144 can be prevented from rotating but still be allowed to translate axially along the collar bore 118, as discussed in detail above.

With the first seat assembly 136 and the second seat assembly 138 installed into the interior cavity 110 of the valve body 102, the ball element 140 can then be installed between the first seat surface 158 and the second seat surface 170. In the embodiment illustrated in FIG. 2, the ball element 140 includes first and second flats 190 and 192 arranged on opposing sides of the ball element 140. In these embodiments, a reduced ball width dimension between the first and second flats 190 and 192 allows the ball element 140 to be installed in a minimal opening between the first and second seat surfaces 158 and 170. That is, the reduced ball width dimension between the first and second flats 190 and 192 can allow the rounded first and second seat surfaces 158 and 170 to be positioned close to one another in a free state (e.g., a state without the ball element 140 arranged in between), and the clearances that determine the distance between the first and second seat surfaces 158 and 170 can be kept to a minimum. In some embodiments, minimizing the clearance between the first and second seat surfaces 158 and 170 in a free state allows the valve body 102 to be constructed with a smaller size, which, in turn, can produce a smaller unbalance area of the bonnet 128. The unbalance area of the bonnet 128 can be the area that pressure within the internal cavity 110 acts upon. As the unbalance area is reduced, the amount of force subjected to the bonnet 128 can be proportionally reduced, which enables the use of smaller fasteners to fasten the bonnet 128 to the valve body 102. The use of smaller fasteners and a smaller valve body 102 reduce a manufacturing cost associated with the ball valve 100.

Once the ball element 140 is installed between the first and second seat surfaces 158 and 170, with the first and second flats 190 and 192 arranged vertically (from the perspective of FIG. 2), the ball element 140 can be rotated approximately ninety degrees to axially align a ball passage 200 with the first seat passage 155 of the first seat 142 and the second seat passage 167 of the second seat 160. When assembled, the ball passage 200 can extend axially along the flow axis 114 to allow fluid to flow through the ball element 140. The first seat passage 155, the ball passage 200, and the second seat passage 167 can combine to form a fluid passageway that extends along the flow axis 114 between the inlet 104 and the outlet 106.

Once the ball element 140 is installed between the first and second seat surfaces 158 and 170, the shaft 108 can be coupled to the ball element 140 so that the ball element 140 rotates with the shaft 108. The contact stress between the first and second seat surfaces 158 and 170 and the ball element 140 can be adjusted or readjusted to "dial in" a desired contact stress by rotating the first seat 142. That is, with the threaded collar 144 prevented from rotating within the collar bore 118, rotating the first seat 142 in a desired direction can either further compress or decompress the biasing element 146, which either increases or decreases the contact stress. The contact stress can be adjusted to ensure that a proper seal is provided between the first and second seat surfaces 158 and 170 and the first and second sides 137 and 139 of the ball element 140, and that the ball element 140 is still allowed to rotate in response to rotation of the shaft 108. Adjustment of the first seat 142 also enables the ball valve 100 to accommodate ball elements of different shapes and sizes. Further, the adjustability of the contact stress provided by the design of the first seat assembly 136 facilitates efficient servicing of the trim arrangement 112, for example, to re-adjust the contact stress or to replace a worn component.

Once the contact stress is adjusted to a desired or predetermined value, the bonnet 128 can be installed with the shaft 108 extending through the shaft aperture 132 and the bonnet 128 at least partially received in the bonnet aperture 122 of the valve body 102. With the bonnet 128 installed within the bonnet aperture 122, the bonnet seal 134 can provide a seal between the bonnet 128 and the bonnet aperture 122, and the bottom surface 180 of the bonnet 128 can prevent rotation of the first and second seats 142 and 160. The installation of the bonnet 128 can lock the rotational orientation of the first and second seats 142 and 160, which can maintain the desired contact stress that was set prior to installation of the bonnet 128. However, the design of the ball valve 100 and, in particular, the trim arrangement 112 can enable the contact stress to be easily adjusted. That is, the bonnet 128 can be removed and the first seat 142 can be rotated in a desired direction to increase or decrease the contact stress, and the bonnet 128 can be reinstalled to again lock the contact stress.

The adjustability of the contact stress provided by the trim arrangement 112 and, in particular, by the first seat assembly 136 improves the manufacturability of the ball valve 100. With the contact stress being adjustable, an axial depth of the collar bore 118 can define large manufacturing tolerances. For example, if the contact stress were not adjustable, the axial depth of the collar bore 118 can determine the compression of the biasing element 146 and thereby the contact stress on the ball element 140. In this case, the axial depth of the collar bore 118 can define strict manufacturing tolerances to achieve a predetermined contact stress. The adjustability of the contact stress provided by the trim arrangement 112 can mitigate a criticality in the axial depth of the collar bore 118, which improves manufacturability of the valve body 102. In some embodiments, the improved manufacturability of the valve body 102 enables the valve body 102 to be a cast part, which reduces manufacturing costs associated with the ball valve 100.

The design of the trim arrangement 112 can accommodate the use of a fully spherical ball element in the ball valve 100. In some embodiments, the ball element 140 can be in the form of a fully spherical ball without the first and second flats 190 and 192. In these embodiments, during assembly, the compression of the biasing element 146 can be removed by rotating the first seat 142 in a desired direction and a fully spherical ball element can be installed in between the first and second seats 142 and 160.

When the ball element 140 is in the closed position and the ball valve 100 is shutting off fluid flow between the inlet 104 and the outlet 106, pressurized fluid can act on the first side 137 of the ball element 140 in an axial direction toward the outlet 106 (i.e., unidirectional shutoff performance). Since the second seat 160 can be in direct contact with the second inner end 109 of the interior cavity 110, the second seat 160 can prevent the ball element 140 from drifting downstream as a result of the pressure acting on the first side 137 of the ball element 140. This can prevent the shaft 108 from tilting and maintain alignment with the ball element 140 for optimized operation.

The ball valve 100 and the trim arrangement 112 can also provide bidirectional shutoff performance, for example, if back pressure from the outlet 106 acts on the second side 139 of the ball element 140, while fluid pressure acts on the first side 137 of the ball element 140. With the ball valve 100 bidirectionally pressurized, the ball element 140 can drift (i.e., move in an axial direction) due to the pressure differential between the first side 137 and the second side 139 of the ball element 140. However, the design of the trim arrangement 112 can maintain the seals provided by the trim arrangement 112, and control the drift of the ball element 140. As described above, axial movement of the first seat 142 does not affect the seal compression between the first seal portion 150 and the first seat seal bore 116 provided by the first seat seal 148, and axial movement of the second seat 160 does not affect the seal compression between the second seal portion 164 and the second seat seal bore 120 provided by the second seat seal 162. Therefore, the first and second seats 142 and 160 can maintain the seals provided against the valve body 102 during drift of the ball element 140.

During upstream drift of the ball element 140 in a direction toward the inlet 104, the biasing element 146 can be further compressed to ensure that the seals between the first and second seat surfaces 158 and 170 and the first and second sides 137 and 139 of the ball element 140 are maintained. In addition, the axial clearance between the first stop surface 157 and the first top surface 125, and/or the axial clearance between the upstream end 196 of the first seal portion 150 and the inlet surface 198 can control how far the ball element 140 can drift upstream. That is, the ball element 140 can be allowed to drift upstream, during bidirectional pressurization, until the first stop surface 157 contacts the first top surface 125 and/or the upstream end 196 contacts the inlet surface 198. In some embodiments, the valve body 102 and the trim arrangement 112 can be manufactured to provide a predetermined clearance between the first stop surface 157 and the first top surface 125, and/or between the upstream end 196 of the first seal portion 150, which determines a maximum distance that the ball element 140 can drift upstream. The predetermined clearance can ensure that the shaft 108 does not tilt out of alignment, for example, with an actuator coupled to the shaft 108 during upstream drift of the ball element 140.

Figure 11:
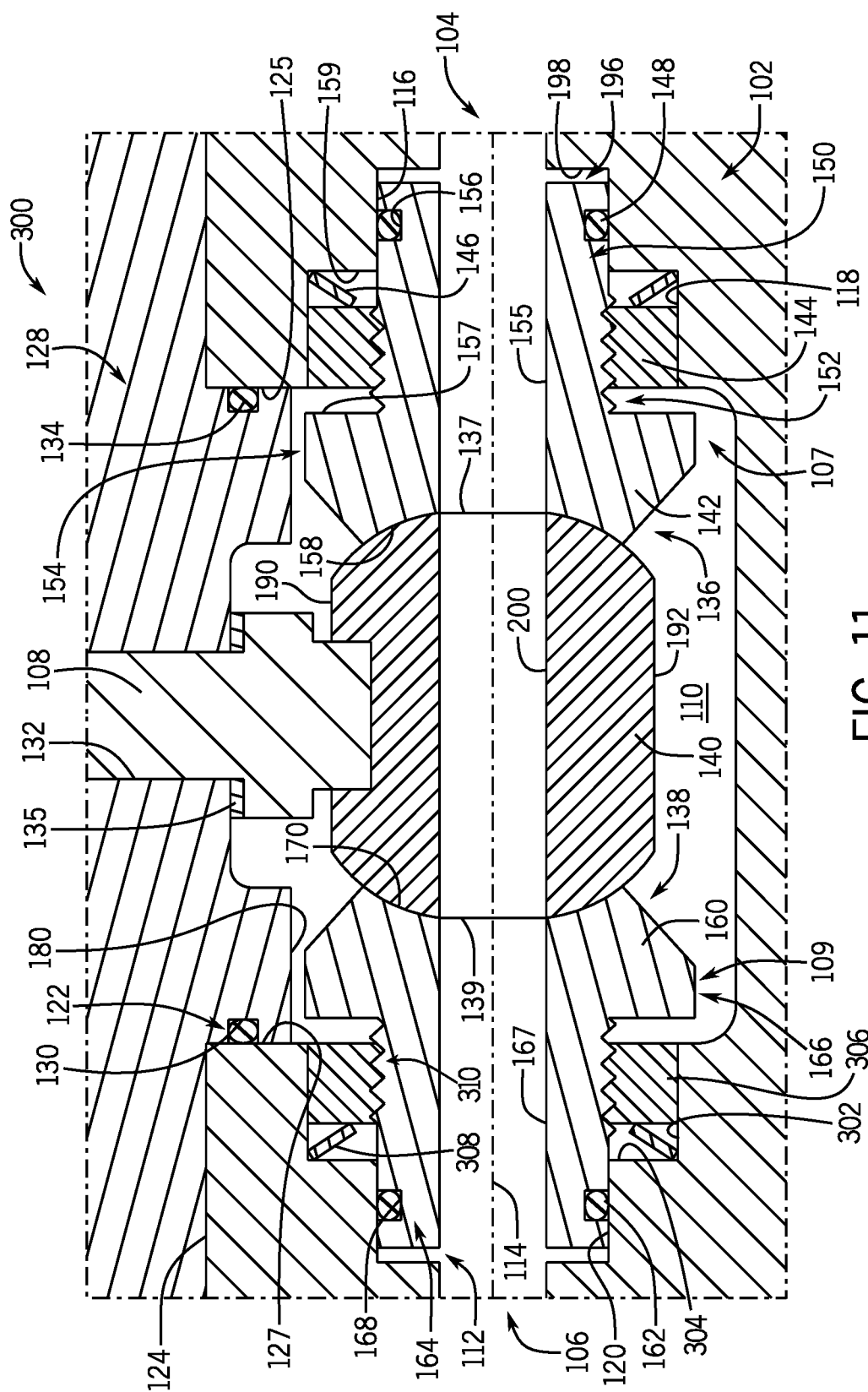
FIG. 11 is a partial cross-sectional view of a ball valve according to another embodiment of the invention.

FIG. 11 illustrates a ball valve 300 according to another embodiment of the invention. The ball valve 300 can include similar components as the ball valve 100, which are identified using like reference numerals. In the illustrated embodiment, the second inner end 109 of the interior cavity 110 can include the second seat seal bore 120 arranged upstream of the outlet 106 and a second collar bore 302 arranged upstream of the second seat seal bore 120. The second collar bore 302 defines a radial recess within the interior cavity 110 that extends in an axial direction along the flow axis 114. In the illustrated embodiment, the second collar bore 302 extends axially from a second biasing surface 304 to the second top surface 127. The second biasing surface 304 extends radially outward between the second seat seal bore 120 and the second collar bore 302 at a junction between the first seat seal bore 120 and the second collar bore 304.

In the illustrated embodiment, similar to the first seat assembly 136, the second seat assembly 138 can include a threaded collar 306 and a second biasing element 308, and the second seat 160 can further include a second threaded portion 310 positioned between the second seat portion 166 and the second seal portion 164. When the ball valve 300 is assembled, the second threaded collar 306 can be threaded onto the second threaded portion 310 of the second seat 160 and received in the second collar bore 302 of the valve body 102. The second biasing element 308 can be arranged between the second biasing surface 304 and the second threaded collar 306. The second biasing element 308 provides a biasing force on the second threaded collar 306 in an axial direction toward the ball element 140. In some embodiments, the biasing force provided by the second biasing element 308 can be adjusted by the second threaded collar 306 being allowed to translate axially along the second collar bore 302 in response to rotation of the second seat 160. In some embodiments, the second biasing element 308 can be in the form of a spring. In other embodiments, the second biasing element 308 can be in the form of a belleville washer, a coil spring, or any other suitable biasing element(s).

Since the second threaded collar 306 is threadably coupled to the second threaded portion 310 of the second seat 160, the second biasing element 308 biases the second seat 160 into engagement with the ball element 140 and can apply a contact stress to the second side 139 of the ball element 140. The contact stress between the second seat surface 170 of the second seat 160 and the second side 139 of the ball element 140 can ensure that a seal is formed between the second seat surface 160 and the second side 139 of the ball element 140 to prevent fluid from leaking past the outlet 106 when the ball valve 100 is in the closed position. In addition, the contact stress can still allow the ball element 140 to rotate while engaging the second seat 160. In some embodiments, the second threaded collar 306 can exhibit similar anti-rotation capabilities, once received within the second collar bore 302 as the threaded collar 144 described above.

The ball valve 300 can be assembled similar to the ball valve 100, described above, except the second seat assembly 138 can be installed similar to the first seat assembly 136, with the second threaded collar 306 being received within second collar bore 302. When assembled, prior to installation of the bonnet 128, the second seat assembly 138 can provide an adjustable contact stress on the second side 139 of the ball element 140 via rotation of the second seat 160 in a desired direction. Thus, the trim arrangement 112 can provide an adjustable contact stress on the first side 137 and the second side 139 of the ball element 140. Due to this adjustability on both sides of the ball element 140, it can be desired to adjust the contact stress to be substantially equal on both sides of the ball element 140 to provide proper alignment of the ball element 140 and the shaft 108. In other words, the first seat 142 and the second seat 160 can be adjusted so that the force on the threaded collar 144 provided by the biasing element 146 can be substantially equal to the force on the second threaded collar 306 provided by the second biasing element 308, prior to installation of the bonnet 128. This can prevent the shaft 108 from tilting and maintain alignment with the ball element 140.

Figure 12:
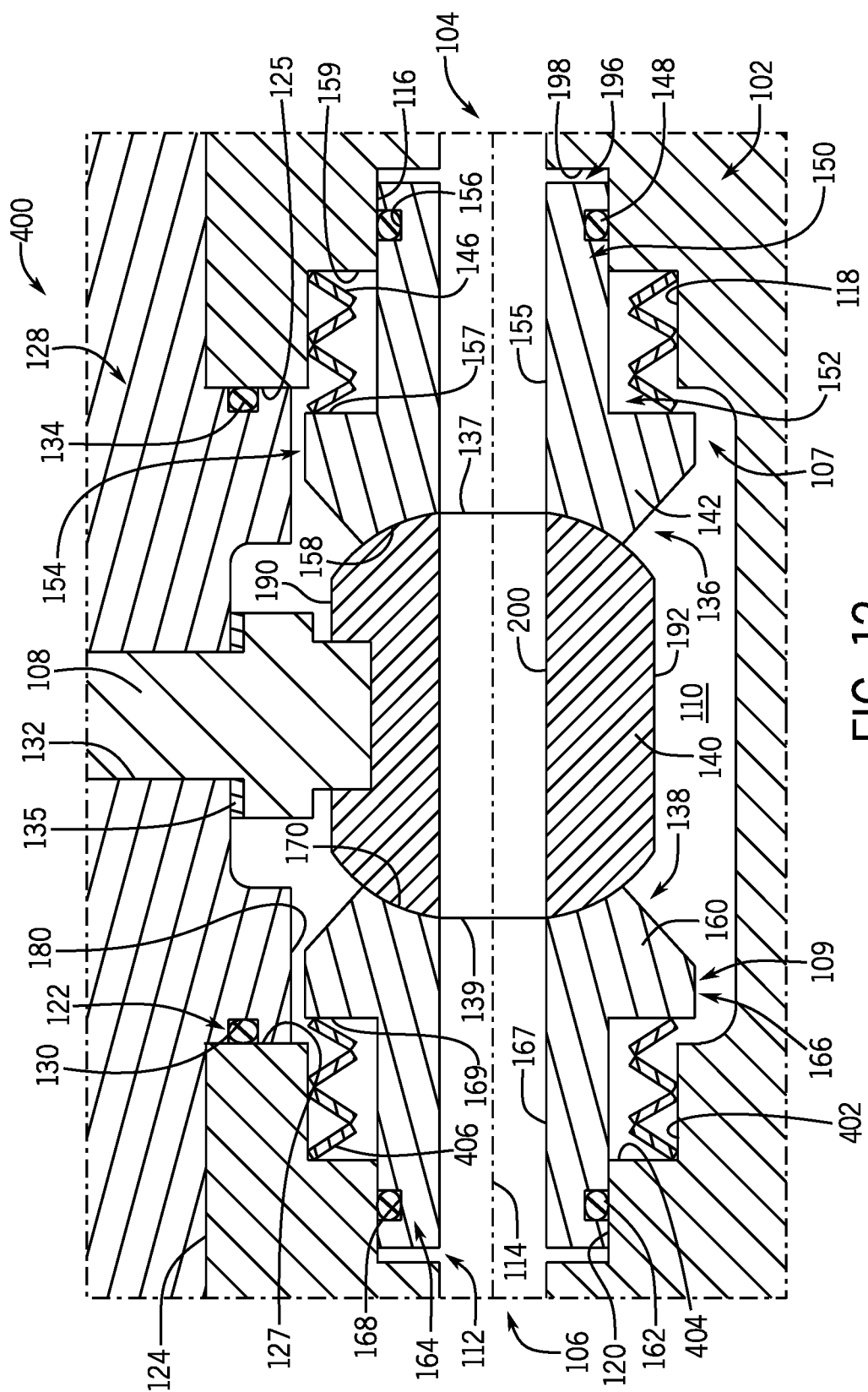
FIG. 12 is a partial cross-sectional view of a ball valve according to yet another embodiment of the invention.

FIG. 12 illustrates a ball valve 400 according to another embodiment of the invention. The ball valve 400 can include similar components as the ball valve 100, which are identified using like reference numerals. In the illustrated embodiment, the valve body 102 is a one-piece valve body (i.e., fabricated from a single piece of material. In the illustrated embodiment, the second inner end 109 of the interior cavity 110 can include the second seat seal bore 120 arranged upstream of the outlet 106, and a second collar bore 402 arranged upstream of the second seat seal bore 120. The second collar bore 402 defines a radial recess within the interior cavity 110 that extends in an axial direction along the flow axis 114. In the illustrated embodiment, the second collar bore 402 extends axially from a second biasing surface 404 to the second top surface 127. The second biasing surface 404 extends radially outward between the second seat seal bore 120 and the second collar bore 402 at a junction between the first seat seal bore 120 and the second collar bore 404.

In the illustrated embodiment, the biasing element 146 extends from the first biasing surface 159 and directly engages the first stop surface 157 of the first seat 142. The second seat assembly 138 includes a second biasing element 406 that is engaged between the second biasing surface 404 and the second stop surface 169 of the second seat 160. The stiffness of the biasing element 146 can control a contract stress applied by the first seat 142 on the first side 137 of the ball element 140. The stiffness of the second biasing element 406 can control a contact stress applied by the second seat 160 on the second side 139 of the ball element 140. The stiffness of the biasing element 146 can be substantially equal to the stiffness of the second biasing element 406 to prevent the shaft 108 from tilting and to maintain alignment with the ball element 140.

Figure 13:
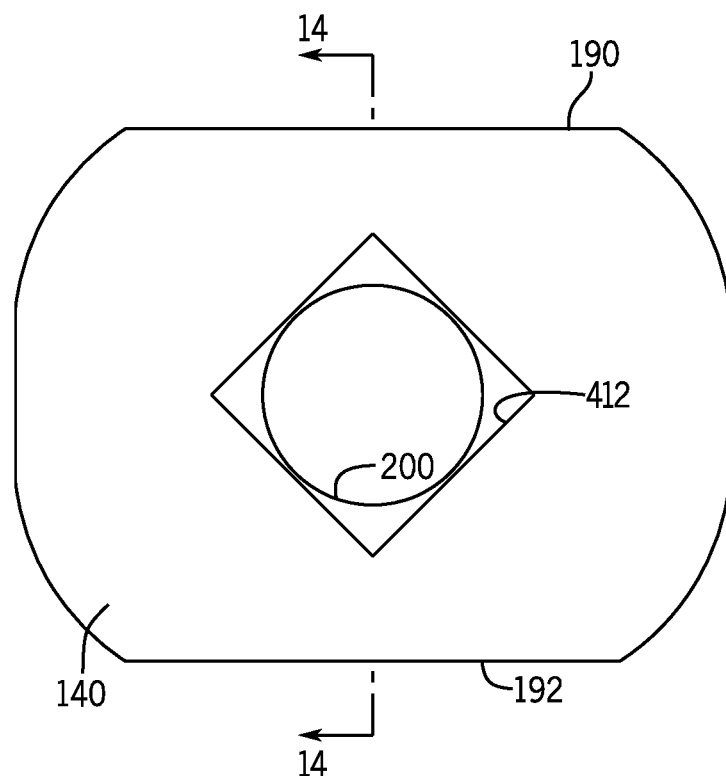
FIG. 13 is a side view of a ball element of the ball valve of FIG. 12 according to one embodiment of the invention.
Figure 14:
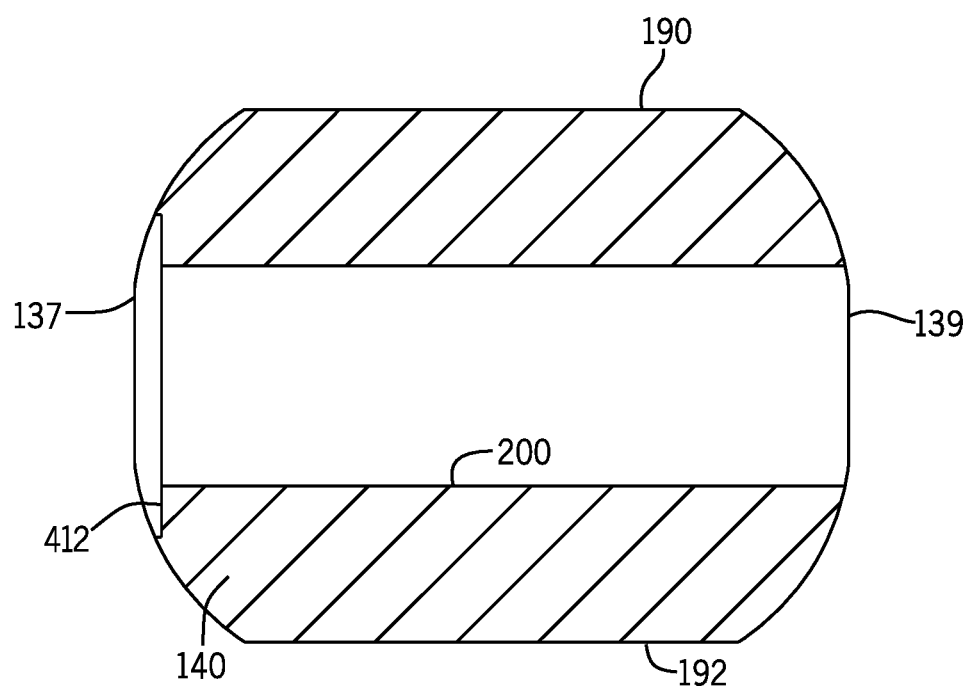
FIG. 14 is a cross-sectional view of the ball element of FIG. 13 taken along line 14-14.

During assembly, as will be described, the biasing element 146 and the second biasing element 406 can force the first seat 142 and the second seat 160 toward one another. To facilitate the installation of the ball element 140 between the first seat 142 and the second seat 160, the ball element 140 can define a geometry that enables rotation control thereof. FIGS. 13 and 14 illustrate an embodiment of the ball element 140 that can be used in the ball valve 400. The ball element 140 includes the first and second flats 190 and 192 arranged on opposing sides of the ball element 140. As will be described, the first and second flats 190 and 192 define a reduced ball width dimension (i.e., a distance between the first and second flats 190 and 192 can be less than a distance between the first and second sides 137 and 139 of the ball element 140), which allows the ball element 140 to be installed in a smaller gap between the first seat surface 158 and the second seat surface 170.

In the illustrated embodiment, the ball element 140 includes a ball recess 412 that extends axially into the first side 137 of the ball element 140. The ball recess 412 can extend a predefined depth axially into the first side 137. In some embodiments, the ball recess 412 can extend axially into the first side 137, so that a tool can be at least partially inserted into the ball recess 412. In some embodiments, the ball element 140 can include a ball recess 412 on both the first side 137 and the second side 139.

In the embodiment illustrated in FIGS. 13 and 14, the ball recess 412 can surround the ball passage 200 and define a geometric profile that provides rotation control of the ball element 140. Specifically, the ball recess 412 can define a geometric profile that enables a tool with a complementary shape to be inserted into the ball recess 412 and control a rotational orientation of the ball element 140. In the illustrated embodiment, the ball recess 412 defines a rectangular shape. In other embodiments, the ball recess 412 can define an oval shape, a polygonal shape (e.g., triangular, polygonal, hexagonal, etc.), or another shape that can ensure that the ball element 140 rotates upon rotation of a similarly shaped tool inserted into the ball recess 412.

Figure 15:
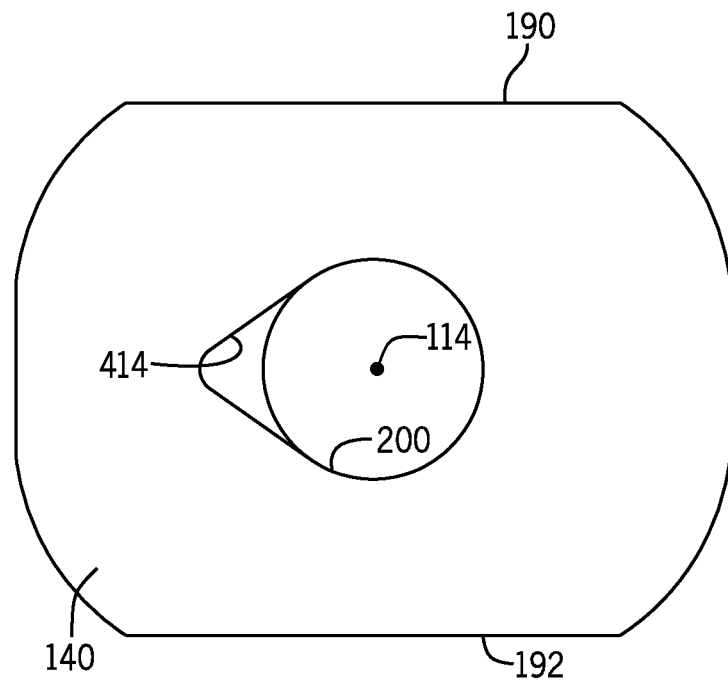
FIG. 15 is a side view of a ball element of the ball valve of FIG. 12 according to another embodiment of the invention.

FIG. 15 illustrates another embodiment of the ball element 140 that can be used in the ball valve 400. In the illustrated embodiment, the ball recess 412 can define a notch 414 that is formed on a side of the ball passage 200 and that is axially aligned with the flow axis 114. Like the ball recess 412 in FIGS. 13 and 14, the notch 414 can provide rotation control of the ball element 140, upon insertion of a tool shaped similarly to the ball passage 200 with the notch 414.

In the illustrated embodiment, the notch 414 can be formed in a leading side of the ball passage 200 and extend radially outward from the ball passage 200. The leading side of the ball passage 200 can be the side first exposed to fluid flow as the ball element 140 is rotated from the closed position to the open position. That is, when the ball element 140 is rotated (e.g., via the shaft 108) from the closed position to the open position, the leading side of the ball passage 200 is the first side to overlap with the first seat passage 155 (see FIG. 12) and enable fluid flow along the flow axis 114.

The notch 414 defined by the ball recess 412 can provide a variable flow area as the ball element 140 is transitioned from the closed position to the open position. In the illustrated embodiment, the notch 414 defines a lateral thickness (i.e., a distance from the top of the notch 414 to the bottom of the notch 414 from the perspective of FIG. 15) that gradually decreases as the notch 414 extends radially outward from leading side of the ball passage 200. In this way, the notch 414 can provide a greater range in the fluid flow rates provided through the ball passage 200 and, thereby, between the inlet 104 and the outlet 106. For example, the notch 414 can enable the ball valve 400 to provide a lower minimum fluid flow rate, when compared with a standard ball passage (i.e., without the notch 414).

Figure 16:
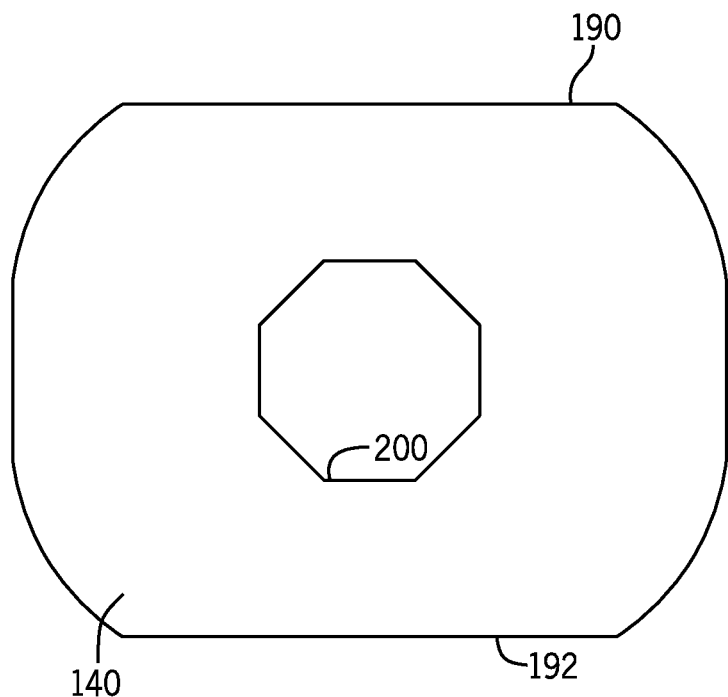
FIG. 16 is a side view of a ball element of the ball valve of FIG. 12 according to another embodiment of the invention.

FIG. 16 illustrates another embodiment of the ball element 140 that can be used in the ball valve 400. The ball element 140 includes a ball passage 200 that defines a geometric profile that provides rotation control of the ball element 140. Specifically, the ball passage 200 can define a geometric profile that enables a tool with a complementary shape to be inserted into the ball passage 200 and control a rotational orientation of the ball element 140. In the illustrated embodiment, the ball passage 200 defines an octagonal shape. In other embodiments, the ball passage 200 can define an oval shape, a polygonal shape (e.g., triangular, rectangular, hexagonal, etc.), or another shape that can ensure that the ball element 140 rotates upon rotation of a similarly shaped tool inserted into the ball passage 200.

Assembly and operation of the ball valve 400 will be described with reference to FIG. 12. The following description of the order in which the components of the ball valve 400 are assembled is not meant to be limiting in any way, and alternative sequences are included in the scope of the invention. To install the trim arrangement 112 of the ball valve 400, the first seat assembly 136 can be installed by arranging the biasing element 146 within the collar bore 118 so that the biasing element 146 engages the biasing surface 159. The first seat 142 can then be inserted through the bonnet aperture 122 and the first seat seal portion 150 can be axially inserted into the first seat seal bore 116. As the first seat seal portion 150 is inserted axially into the first seat seal bore 116, the first seat seal 148 can engage and slide axially along the first seat seal bore 116 and the first stop surface 157 of the first seat 142 can engage the biasing element 146.

The second seat assembly 138 can be installed into the interior cavity 110, initially, by installing the second biasing element 406 into the second collar bore 402 to engage the second biasing surface 404. The second seat 160 can then be inserted through the bonnet aperture 122 of the valve body 102 and the second seal portion 164 can be axially inserted into the second seat seal bore 120. As the second seal portion 164 is inserted axially into the second seat seal bore 120, the second seat seal 162 can engage and slide axially along the second seat seal bore 120 and the second stop surface 169 of the second seat 160 can engage the second biasing element 308.

With the first seat assembly 136 and the second seat assembly 138 installed into the interior cavity 110 of the valve body 102, the ball element 140 can then be installed between the first seat surface 158 and the second seat surface 170. In the embodiment illustrated in FIG. 12, the ball element 140 includes the first and second flats 190 and 192 arranged on opposing sides of the ball element 140. The reduced ball width dimension defined between the first and second flats 190 and 192 allows the ball element 140 to be installed in a minimal opening between the first and second seat surfaces 158 and 170. That is, the reduced ball width dimension between the first and second flats 190 and 192 can allow the rounded first and second seat surfaces 158 and 170 to be positioned as close as possible to one another in a free state (i.e., a state without the ball element 140 arranged in between).

The ball element 140 can be inserted through the bonnet aperture 122 with the first and second flats 190 and 192 facing the first and second seat surfaces 158 and 170 and the ball passage 200 being accessible through the bonnet aperture 122 (i.e., oriented in a vertical direction from the perspective of FIG. 12). With the ball element 140 arranged within the interior cavity 110 and the first and second flats 190 and 192 facing the first and second seat surfaces 158 and 170, the ball element 140 can require a rotation of ninety degrees to engage the spherical sides of the ball element 140 with the first and second seat surfaces 158 and 170. To accomplish this rotation, the first and second seat surfaces 158 and 170 must spread apart axially against the force of the biasing element 146 and the second biasing element 406, which can require a substantial amount of torque depending on the stiffness of the biasing elements 146 and 406. The rotation control provided by the ball element 140 can enable a tool to be inserted through the bonnet aperture 122 and at least partially into the ball element 140 to provide the necessary rotation. While the ball passage 200 is maintained substantially perpendicular to the first and second seat passages 155 and 167, or in a vertical arrangement (from the perspective of FIG. 12), a tool with a similar shape as the ball recess 412 can be inserted into the ball recess 412 and rotate the ball element 140. The anti-rotation geometry defined by the ball recess 412 can ensure that rotation of the tool results in rotation of the ball element 140 (see FIGS. 13 and 14). In other embodiments, a tool with a similar shape as the ball passage 200 and notch 414 can be inserted into the combined geometry (i.e., the ball passage 200 and the notch 314) and rotate the ball element 140 (see FIG. 15). In still other embodiments, a tool can be inserted into the ball passage 200 and the ball passage 200 can define a geometric profile that ensures rotations, upon rotation of the tool (see FIG. 16).

In any case, the rotation control properties of the ball element 140 can enable the ball element 140 to be rotated within the minimized clearance between the first and second seat surfaces 158 and 170. Once the ball element 140 is rotated ninety degrees via the tool inserted at least partially into the ball element 140, the spherical sides of the ball element 140 can be in contact with the first and second seat surfaces 158 and 170. The ball element 140 can then be rotated another ninety degrees to axially align the ball passage 200 with the first and second seat passages 155 and 167 along the flow axis 114. With the ball element 140 installed, the shaft 108 and the bonnet 128 can be installed as described above with reference to the ball valve 100.

During installation, the reduced ball width dimension provided by the first and second flats 190 and 192 of the ball element 140 can minimize the amount of displacement between the first and second seat surfaces 158 and 170 (i.e., axial movement away from one another) to properly position the ball element 140 for operation. In some embodiments, this minimized seat spread can allow the valve body 102 to be constructed with a smaller bonnet aperture 122 through which the trim arrangement 112 can be accessed. A smaller bonnet aperture 122 also reduces the unbalance area of the bonnet 128. Reducing the unbalance area of the bonnet 128 can result in fewer, or smaller, pressure retaining fasteners used to secure the bonnet 128 to the valve body 102. Fewer, or smaller, pressure retaining fasteners allows the overall size of the valve body 102 to be reduced, which directly correlates to reduced manufacturing costs.

Minimizing the amount of displacement between the first and second seat surfaces 158 and 170 for installation of the ball element 140 can also enable the trim arrangement 112 to utilize predetermined, minimized trim-to-body clearances. That is, an axial clearance between the first stop surface 157 and the first top surface 125 and an axial clearance between the second stop surface 169 and the second top surface 127 can be designed to a predetermined, minimized value. The predetermined, minimized trim-to-body clearances fosters optimized uni-directional and bi-directional shutoff if the first seat 142 and/or the second seat 160 are intended to drift solid. For example, in high pressure shutoff applications, the ball element 140 can drift downstream or upstream due to pressure differentials between the inlet 104 and the outlet 106. The predetermined, minimized trim-to-body clearances can ensure that either the first stop surface 157 contacts the first top surface 125 or the second stop surface 169 contacts the second top surface 127 at elevated shutoff pressures. By ensuring that either the first stop surface 157 contacts the first top surface 125 or the second stop surface 169 contacts the second top surface 127 at elevated shutoff pressures (i.e., drift solid), the trim arrangement 112 can maintain the contact stress on the ball element 140 at elevated shutoff pressures. In addition, the predetermined, minimized trim-to-body clearances can limit the amount of drift of the ball element 140, which can prevent the shaft 108 from tilting and maintain alignment with the ball element 140 for optimized operation.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A trim arrangement for a ball valve, the ball valve including a valve body and a ball element in an interior cavity of the valve body, the trim arrangement comprising:
   a first seat assembly including a first seat, a threaded collar, and a biasing element, the first seat being in contact with a first side of the ball element, the threaded collar being threadably coupled to the first seat and in engagement with the biasing element, and the threaded collar having an interrupted circumferential profile that is configured to non-rotatably and slidably engage a corresponding interrupted circumferential profile of a collar bore of the valve body to prevent rotation of the threaded collar relative to the valve body; and
   a second seat assembly including a second seat in contact with a second side of the ball element, the biasing element biasing the first seat toward the first side of the ball element to provide a contact stress between the first seat and the first side of the ball element and the second seat and the second side of the ball element, and the contact stress provided by the biasing element being adjustable by rotating the first seat.

2. The trim arrangement of claim 1, wherein the first seat includes a first seat portion, a threaded portion, and a first seal portion, the threaded portion being between the first seat portion and the first seal portion.

3. The trim arrangement of claim 2, wherein the first seat portion includes a first seat surface being conformed to the first side of the ball element and in contact with the first side of the ball element.

4. The trim arrangement of claim 2, wherein the threaded collar is threadably coupled to the threaded portion of the first seat.

5. The trim arrangement of claim 2, wherein the first seal portion includes a recessed notch to receive a first seal.

6. The trim arrangement of claim 1, wherein the interrupted circumferential profile of the threaded collar includes at least one of: a flat surface or a recessed slot.

7. The trim arrangement of claim 1, wherein the second seat includes a second seat portion and a second seal portion; and
   wherein the second seat portion includes a second seat surface being conformed to the second side of the ball element and in contact with the second side of the ball element.

8. The trim arrangement of claim 6, wherein the second seal portion includes a recessed notch to receive a second seal.

9. A ball valve comprising:
   a valve body including an interior cavity, the interior cavity including a collar bore having an interior geometric profile;
   a ball element positioned in the interior cavity; and
   a trim arrangement in the interior cavity, the trim arrangement including:
     a first seat in contact with a first side of the ball element;
     a second seat in contact with a second side of the ball element;
     a threaded collar received in the collar bore and threadably coupled to the first seat, the threaded collar having an exterior geometric profile complementary to the interior geometric profile of the collar bore to stop the threaded collar from rotating in the collar bore and to allow the threaded collar to slidably translate along the collar bore; and
     a biasing element engaged between a biasing surface of the collar bore and the threaded collar to provide a contact stress between the first seat and the first side of the ball element and the second seat and the second side of the ball element, the contact stress provided by the biasing element being adjustable by translating the threaded collar along the collar bore.

10. The ball valve of claim 9, wherein the first seat includes a first seat portion, a threaded portion, and a first seal portion, the threaded portion being between the first seat portion and the first seal portion, and the threaded collar being threadably coupled to the threaded portion of the first seat.

11. The ball valve of claim 10, wherein the first seat portion includes a first seat surface being conformed to the first side of the ball element and in contact with the first side of the ball element.

12. The ball valve of claim 10, wherein the first seal portion includes a recessed notch to receive a first seal, the first seal portion being received in a first seat seal bore of the interior cavity, the first seat seal bore being upstream of the collar bore; and
   wherein the first seal provides a seal between the first seat and the first seat seal bore, the first seal being slidable along the first seat seal bore.

13. The ball valve of claim 9, wherein the exterior geometric profile of the threaded collar includes one or more of: an oval profile, a polygonal profile, a flat surface that interrupts a circumferential profile, or a recessed slot.

14. The ball valve of claim 9, wherein the second seat includes a second seat portion and a second seal portion, the second seat portion including a second seat surface being conformed to the second side of the ball element and in contact with the second side of the ball element.

15. The ball valve of claim 14, wherein the second seal portion includes a recessed notch to receive a second seal, the second seal portion being received in a second seat seal bore of the interior cavity, the second seat seal bore on an opposing inner end of the interior cavity.

16. The ball valve of claim 15, wherein the second seal provides a seal between the second seat and the second seat seal bore, the second seal being slidable along the second seat seal bore.

17. The ball valve of claim 9, further comprising:
a bonnet having a bottom surface, the first seat being inhibited from rotating by a first clearance between the first seat and the bottom surface of the bonnet, in response to the bonnet being installed onto the valve body, and the second seat being inhibited from rotating by a second clearance between the first seat and the bottom surface of the bonnet, in response to the bonnet being installed onto the valve body.

18. A ball valve comprising:
a valve body including a bonnet aperture and an interior cavity, the interior cavity including a collar bore;
a bonnet that is configured to be at least partially received in the bonnet aperture and that includes a bottom surface in the interior cavity;
a ball element in the interior cavity; and
a trim arrangement in the interior cavity and including:
a first seat in contact with a first side of the ball element, the first seat being inhibited from rotating by a first clearance between the first seat and the bottom surface of the bonnet;
a threaded collar received in the collar bore and threadably coupled to the first seat; and
a biasing element engaged between a biasing surface of the collar bore and the threaded collar;
when the bonnet is received in the bonnet aperture, the threaded collar being inhibited by the bonnet from rotating in the collar bore; and
when the bonnet is removed from the bonnet aperture, the threaded collar being allowed to translate along the collar bore during rotation of the first seat to adjust a biasing force provided by the biasing element on the first seat.

19. The ball valve of claim 18, further comprising:
a second seat in contact with a second side of the ball element, the second seat being inhibited from rotating by a second clearance between the second seat and the bottom surface of the bonnet.

20. The ball valve of claim 19, wherein the first seat includes a first seat portion having a first seat surface being conformed to the first side of the ball element and in contact with the first side of the ball element, a threaded portion, and a first seal portion, the threaded portion being between the first seat portion and the first seal portion, and the threaded collar being threadably coupled to the threaded portion of the first seat; and
wherein the second seat includes a second seat portion and a second seal portion, the second seat portion including a second seat surface being conformed to the second side of the ball element and in contact with the second side of the ball element, and the second seal portion including a recessed notch to receive a second seal.

* * * * *